United States Patent [19]

Duncan

[11] Patent Number: 4,498,340
[45] Date of Patent: Feb. 12, 1985

[54] DAMPING MECHANISM FOR GYROSCOPES

[75] Inventor: Damon H. Duncan, Phoenix, Ariz.

[73] Assignee: Sperry Corporation, New York, N.Y.

[21] Appl. No.: 483,078

[22] Filed: Apr. 7, 1983

[51] Int. Cl.³ .................. G01C 19/06; G01C 19/42
[52] U.S. Cl. ........................................ 73/504; 73/522; 74/5 F
[58] Field of Search .................. 73/504, 522, 430; 74/5.5, 5 F

[56] References Cited

U.S. PATENT DOCUMENTS

| | | | |
|---|---|---|---|
| 2,605,093 | 7/1952 | Dorand | 73/516 R |
| 3,323,377 | 6/1967 | Fraiser et al. | 73/504 X |
| 4,147,063 | 4/1979 | Bower et al. | 73/504 |

Primary Examiner—James J. Gill
Attorney, Agent, or Firm—Howard P. Terry

[57] ABSTRACT

A damping mechanism for a two-degree-of-freedom rate gyroscope of the flexible disk type includes a pair of auxiliary disks, one mounted closely adjacent each side of the rotor disk to provide squeeze film type damping of any axial vibrations of the rotor at the resonant frequencies of the flexible rotor.

3 Claims, 3 Drawing Figures

DAMPING MECHANISM FOR GYROSCOPES

BACKGROUND OF THE INVENTION

1. Field of the Invention

The present invention relates generally to two-degree-of-freedom (TDOF) gyroscopes and more particularly to TDOF gyroscopes of the flexible disk type. Specifically, the present invention relates to damping mechanisms for such gyroscopes for damping axial vibrations of the rotor at vibration frequencies resonant with the natural frequency of the rotor.

2. Description of the Prior Art

TDOF gyroscopes utilizing a spinning flexible disk rotor for sensing angular turning rates about orthogonal axes, each orthogonal to each other and to the rotor spin axis are well known in the art as exemplified by U.S. Pat. Nos. 3,323,377 and 3,998,105. As disclosed therein, a thin flexible disk is mounted on the end of a shaft spun at relatively high rotational velocities by a spin motor. Rotation of the gyro housing about the orthogonal axes results in a processional deflection of the flexible disk rotor relative to its plane of rotation proportional to the rate of such rotation. Suitable electrical transducers supported on the gyro housing on the orthogonal axes are provided for providing electrical signals proportional to such precession and hence proportional to the input angular rates.

While the principles of the flex disk gyro have been known for many years, these have been limited, if any, practical application thereof, particularly in conventional aircraft. One of the reasons for this is believed to be the large errors generated in the sensor's outputs when it is subjected to ambient vibrations along or having substantial components along the disk spin axis at frequencies corresponding to the natural resonant frequency of the flexible rotor.

Generally, and as disclosed in the cited patents, there are two pairs of transducers or pick-offs, one pair for each sensing axis, the pick-offs of each pair being diametrically fixed to the housing adjacent the periphery of the disk and each pair being electrically connected in push-pull fashion. Thus, when the disk deflects or precesses due to an angular rate of the housing, one side of the disk deflects toward one of the pick-offs of the pair and away from the other, the outputs of both pick-offs differentially adding to produce an output signal proportional to the direction and magnitude of the input angular rate.

When the gyro is subjected to vibrations along the gyro spin axis at or near the resonant frequency of the flexible rotor, it has been found that unacceptably large steady state errors in the electrical signal outputs of the gyro occur. These errors are due to two phenomenon: (a) large axial displacements of the rotor periphery (in the same direction) due to such resonance, and (b) non-uniformity between the electrical output vs. deflection characteristics of the pick-offs of each pair. If, indeed the pick-offs had identical characteristics, their outputs due to axial displacements if the rotor periphery in the same direction would cancel. However, achieving such identity is difficult and of course costly.

The errors discussed above can be substantially reduced by concentrating on their primary cause, vis.: by reducing the axial displacement of the rotor periphery due to axial vibrations to as small a value as practical and hence reduce the effects of pick-off dissimilarity.

SUMMARY OF THE INVENTION

In accordance with the present invention, the undesirable large resonant displacements of the rotor are reduced significantly by providing means for damping such resonant displacements of the rotor. This damping means comprises two disks one on each side of the disk rotor and closely spaced thereto so as to provide gas or squeeze-film suppression of the resonant axial displacements of the rotor peripheries. Each damping disk is the same or substantially the same thickness of the rotor itself so that they have substantially no damping effect due to normal disk flexing due to precession. Also, the damping disks are lightweight so as not to require rotational balance of the rotor. Further, the addition of the damping disks does not materially alter the cost of the gyro sensor.

BRIEF DESCRIPTION OF THE DRAWINGS

A preferred embodiment of the invention is illustrated in the accompanying drawings wherein.

DESCRIPTION OF THE PREFERRED EMBODIMENT

Figure 1:
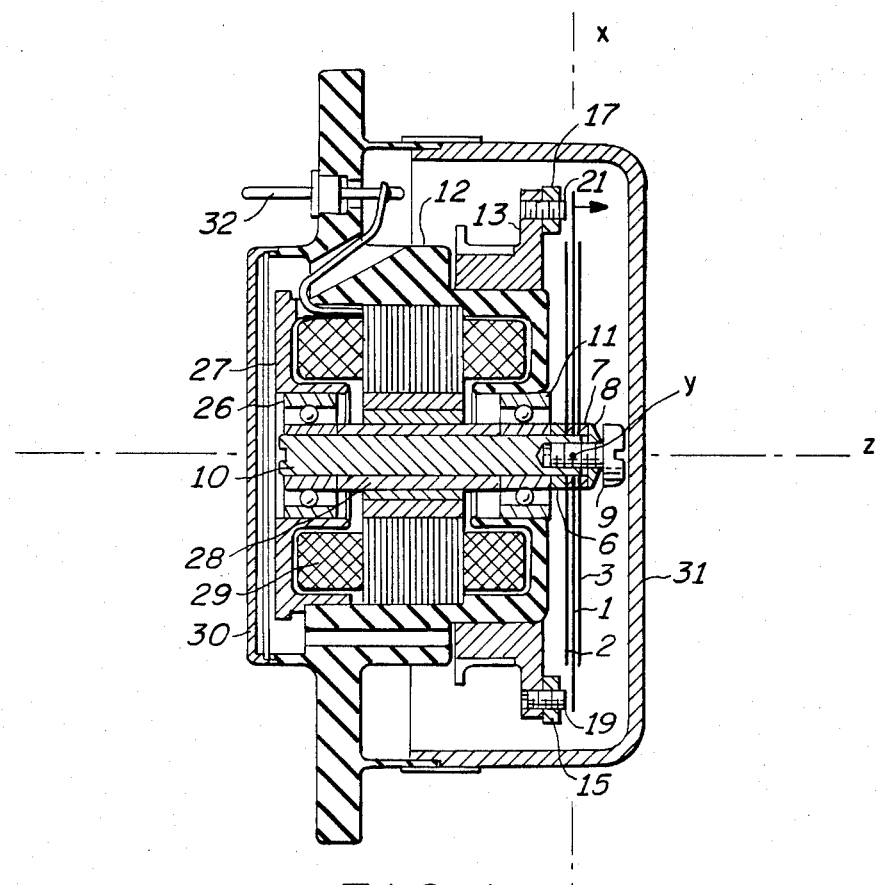
FIG. 1 is a cross-sectional view of the flexible disk TDOF gyro of the present invention.

Referring now to FIG. 1, the TDOF flex-disk rate sensor comprises generally a sensor housing 12 adapted to be rigidly mounted on a vehicle, the rates of rotation about axes x and y of which are to be measured. Suitable covers 30 and 31 are hermetically sealed to the housing which is evacuated and then backfilled with a suitable damping medium, such as helium. Electrical terminals 32 are hermetically sealed to the housing to conduct operating voltages into and out of the housing. Fixedly secured within the housing 12 is the stator 29 of an electric spin motor, the motor rotor 28 being mounted in suitable spin bearings 11 and 26 for spinning about the rotor spin axis z. The motor rotor 28 includes an internal shaft 10, bearing spacer and internal bearing races. One end of rotor shaft 10 extends axially beyond the housing 12 and is internally threaded to receive a rotor clamping screw 9.

The gyro main rotor 1 comprises a very thin disk of flexible material such as beryllium copper. In the preferred embodiment, the rotor disk 1 is 1.592 inches in diameter and 0.004 inches thick; conventional mechanical and electrical machining techniques are used to produce uniformity of thickness and freedom of internal material stresses to thereby assure uniform flexure thereof. The rotor 1 is clamped to the end of rotor shaft 10 by means of clamping screw 9 and spring washer 8, shown more clearly in FIGS. 2 and 3.

Rotor flexing or precessing resulting from a rate of rotation of housing 12 about the y—y axis of FIG. 1, is detected by a pair of inductive pick-offs mounted on a support frame 13 and located adjacent the periphery of rotor 1 at diametrically opposite sides thereof along axis x—x of FIG. 1. Each pick-off comprises a coil bobbin 15, 17 mounted on permeable core members 19, 21 respectively. Thus, when rotor 1 flexes in response to a turn rate about the y—y axis, it assumes that flat S shape shown in FIG. 2 so that the gap between pick-off core 21 and the disk periphery increases and that between core 19 and the disk periphery decreases producing a resultant output of the differentially connected coils 15 and 17 proportional to such deflection. The magnitude of the deflection δ is of course proportional to the magnitude of the housing turn rate. It will be understood, of course, that corresponding pick-offs are provided on frame 13 orthogonal to pick-offs 17, 19 for providing output signals proportional to housing rates about the x—x axis of FIG. 1.

It has been found that large errors in the output signal are generated when the sensor is subjected to vibrations along the spin axis z—z, especially when such vibrations include frequencies corresponding to the natural flexing frequency of the thin rotor 1. Such resonant frequencies tend to produce excessive flexure of the disk 1 into the flat U-shape shown in FIG. 3, its displacement magnitude Δ tending to build up and saturate the pick-offs and mask their normal outputs.

In accordance with the present invention, damping means has been added to the sensor to supress the U-shaped deflection and thereby greatly reduce or substantially eliminate the vibration induced error. The damping means comprises the addition of two auxiliary or damping disks 2 and 3, one on each side of the main rotor disk 1 and slightly axially spaced therefrom. The structure of the rotor including the damping disk is shown clearly in FIGS. 2 and 3. A first sleeve 6 (serving also as a bearing race clamp) provides a clamp base for the rotor disk while spacers 4 and 5 serve to separate the damping disks 2 and 3 respectively from the main rotor 1. A further sleeve 7, spring washer 8 and screw 9 serve to clamp the main rotor 1 and auxiliary rotor disk 2 and 3 together to form the composite flex disk rotor. In the preferred embodiment, each of the damping disks are the same 0.004 inch thickness as the main rotor 1 but of slightly less diameter, 1.125 inch, than the main rotor so as to provide a different natural resonant frequency from that of the main rotor and so as not to interfere with pick-off operation. The thickness of the spacers 4 and 5 is in the order of 0.004 inch to 0.006 inch depending upon the natural resonant frequency characteristics of rotor and its spin velocity. The disks 2 and 3 are of the same material as the rotor 1 and are fabricated identically so that their flexural characteristics are the same.

Figure 2:
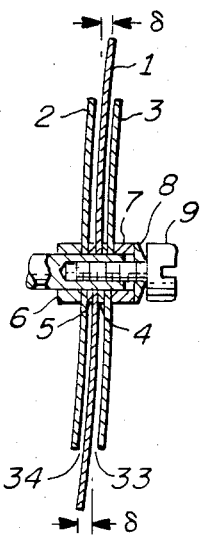
FIG. 2 is a side view of the rotor of the gryo of FIG. 1 showing its normal precessional deflection in response to an input rate of its housing.
Figure 3:
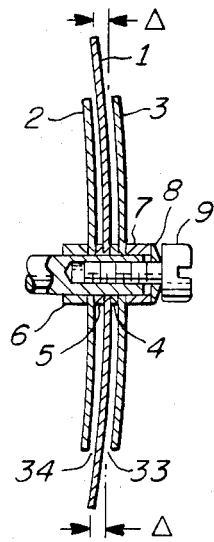
FIG. 3 is a similar view showing an axial deflection of the rotor under the influence of a resonant vibration of the housing along the rotor spin axis.

In operation under the influence of a housing turn rate about the y—y axis, all three disks deflect into the characteristic flat S shape as shown in FIG. 2. Note that the spacing 33 and 34 between the peripheries of the damping disks 3 and 2 remain substantially the same. The addition of the damping disks do not significantly effect the sensor scale factor. In the preferred embodiment, the scale factor was reduced only by about 20%.

In operation of the sensor in the presence of vibrations along or having components along, the spin axis z—z is vastly improved. Under such vibrations, the main rotor 1, due to its greater diameter and hence its mass, relative to the damping disks 2 and 3, will deflect more than the damping disks and the surrounding gas will be alternately squeezed between the main rotor disk and the damping disk. Squeeze-film damping of the axial vibration resonance results and the displacement Δ is substantially or completely eliminated. For example, before the addition of the damping disks, a d.c. error in the pick-off output of 30°/sec per G was induced by axial vibration. With the addition of the damping disks of the present invention, this error was reduced to less than 0.015°/sec per G.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In a gyroscopic angular rate sensor of the type having a closed housing containing a compressible fluid and a thin flexible disk rotor therein, a spin motor coupled with said disk for spinning the same about a spin axis normal to the plane of said disk whereby upon rotation of said housing about axes orthogonal to said spin axis said disk deflects out of its plane of rotation due to precessional forces acting thereon, pick-off means fixed to said housing for supplying output signals proportional to such rotor deflection, and squeeze film fluid damping means coupled with said disk for damping deflections of said disk resulting from vibrations thereof in the direction of said spin axis; wherein said damping means comprises auxiliary disk means supported on each side of and parallel to said disk rotor and spaced therefrom a small distance to provide said squeeze film damping, said spin motor including a rigid shaft extending along said spin axis, wherein said disk rotor is rigidly supported on said shaft and wherein said auxiliary disk means comprises first and second disks rigidly supported on said shaft on each side of said first rotor and spacer means between each of said auxiliary disks and said disk rotor, wherein the improvement comprises providing each of said auxiliary disks with a thickness that is the same or substantially the same as that of said disk rotor whereby said auxiliary disks deflect with said disk rotor in response to said precessional forces.

2. The rate sensor as set forth in claim 1 wherein said pick-off means are located adjacent the periphery of said disk rotor and wherein the diameter of at least one of said auxiliary disks is less than the diameter of said disk rotor whereby it does not interfere with the operation of said pick-off means.

3. The rate sensor as set forth in claim 1 wherein the diameters of both of said auxiliary disks are less than the diameter of said disk rotor whereby the natural resonant frequency of the disk rotor to axial vibrations is different from the natural resonant frequency of said auxiliary disks to said axial vibrations.

* * * * *